June 13, 1961 — M. B. CONRAD — 2,988,323
SUBSURFACE VALVE APPARATUS FOR WELL BORES
Filed Aug. 12, 1957 — 2 Sheets-Sheet 1
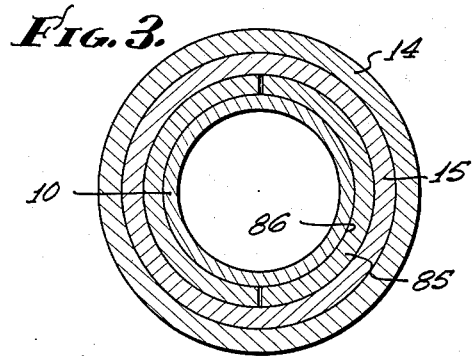
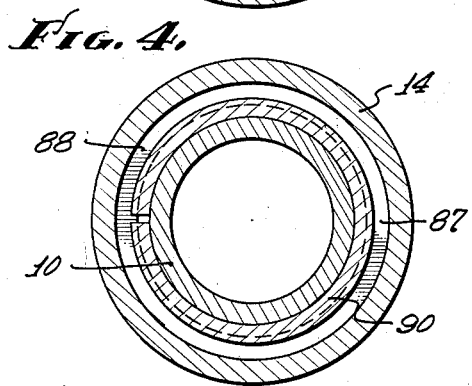
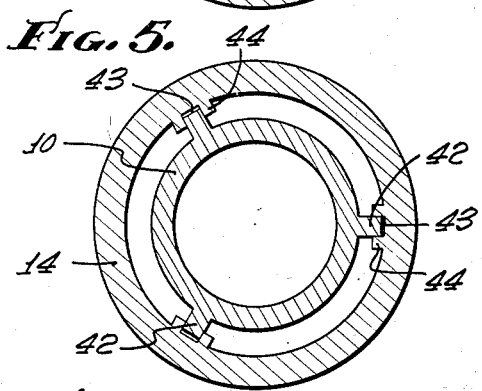
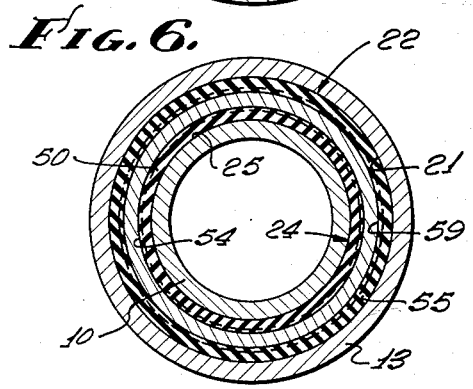
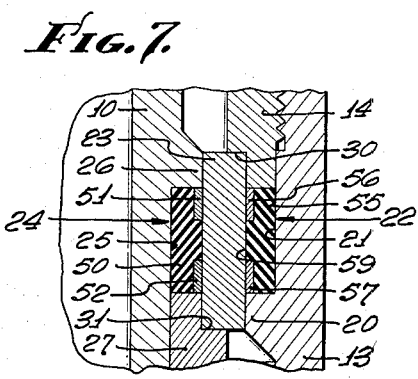
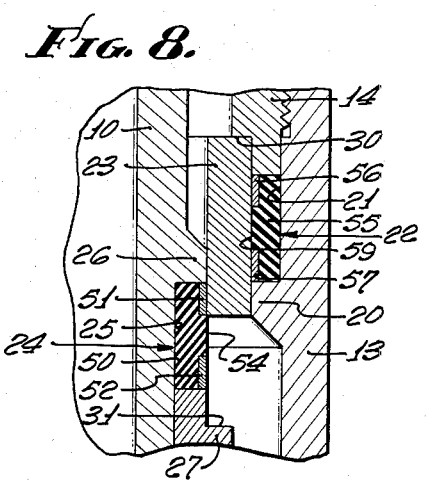
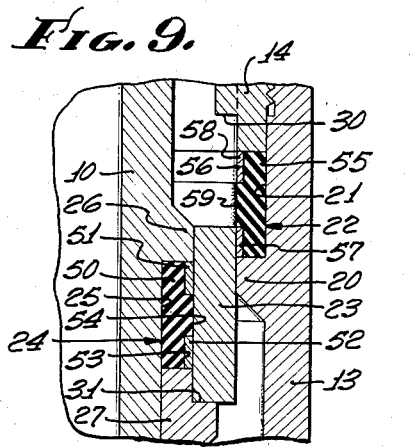
INVENTOR.
MARTIN B. CONRAD
BY
Meelin and Hanscom
ATTORNEYS.

June 13, 1961  M. B. CONRAD  2,988,323
SUBSURFACE VALVE APPARATUS FOR WELL BORES
Filed Aug. 12, 1957  2 Sheets-Sheet 2
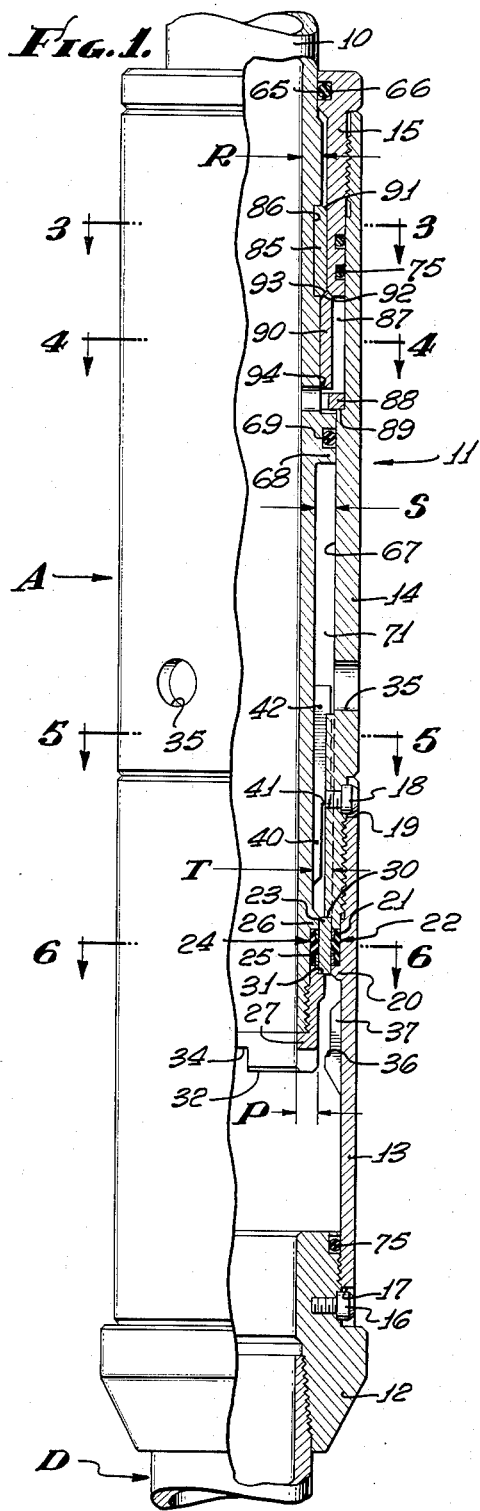
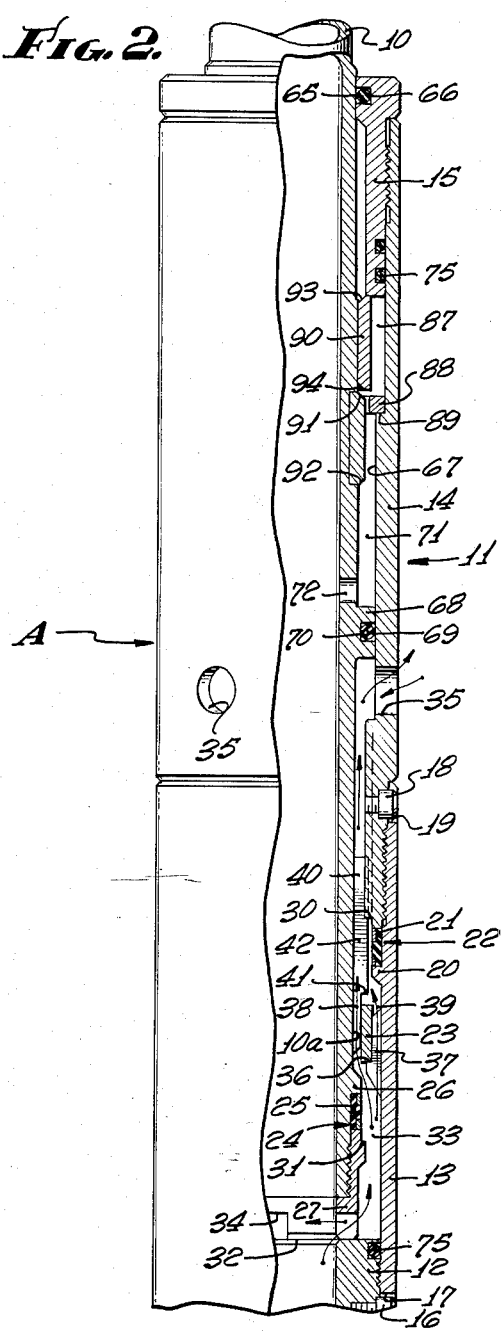
INVENTOR.
MARTIN B. CONRAD
BY
Mellin and Hanscom
ATTORNEYS.

2,988,323
SUBSURFACE VALVE APPARATUS FOR WELL BORES
Martin B. Conrad, Downey, Calif., assignor to Baker Oil Tools, Inc., Los Angeles, Calif., a corporation of California
Filed Aug. 12, 1957, Ser. No. 677,608
6 Claims. (Cl. 251—347)

The present invention relates to valve apparatus, and more particularly to subsurface apparatus for controlling the passage of fluids between the interior and exterior of a tubular string disposed in a well bore, such as a string of drill pipe or tubing.

Valves oftentimes embody pliant, elastic seal rings, such as rubber or rubber-like members, for sealing against a companion surface to effect a complete and leakproof shut-off of the valve. Such a seal ring is usually mounted in a confining groove, from which it may be blown by a high pressure differential when the valve is opened or closed. In addition, when a seal ring is sealed against a companion surface, there has heretofore been a clearance space, no matter how small, between such surface and the member carrying the elastic seal ring into or through which the ring can be forced, usually under high pressure differential conditions.

An object of the present invention is to provide an improved valve apparatus embodying pliant, elastic seal rings adapted to seal against companion surfaces, in which pressure differentials cannot blow the seal rings out of their confining grooves when the valve apparatus is opened or closed, regardless of the direction in which the pressure differential is acting.

Another object of the invention is to provide a valve apparatus embodying pliant, elastic seal rings adapted to simultaneously seal against companion surfaces on an intervening floating or movable sleeve or annular member, in which the floating sleeve is not moved from a seal ring until the pressure acting on that seal ring is substantially balanced, thereby preventing any pressure differential from acting on the seal ring, unless the latter is backed up by the floating sleeve. Because of the valve arrangement employed, pressure differentials are never present which would tend to blow a pliant, elastic seal ring from its confining groove in the apparatus.

A further object of the invention is to provide a valve apparatus embodying pliant, elastic seal rings adapted to simultaneously seal against companion inner and outer surfaces on an intervening floating annular member, in which a comparatively large circulation area is present around the region of the seals when the valve apparatus is in open position.

An additional object of the invention is to provide a valve apparatus embodying pliant, elastic seal rings adapted to simultaneously seal against companion inner and outer surfaces on an intervening floating annular member, in which the floating annular member is prevented from shifting back and forth when the valve apparatus is in an open condition, thereby preventing the annular member from potentially restricting fluid circulation through the valve apparatus.

Still another object of the invention is to provide a valve apparatus embodying a pliant, elastic seal ring mounted on a first valve member and adapted to seal against the surface of a second valve member having adequate running clearance with the first member, in which the clearance space is fully bridged when the valve is closed to prevent high pressure differentials from forcing the seal ring into such space. More specifically, the pressure differential acting on the seal ring causes it to effect a bridging or complete closing of the clearance space so that there is, in effect, zero clearance between the valve members.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a combined longitudinal sectional and side elevational view of the valve apparatus with its part in closed position;

FIG. 2 is a view similar to FIG. 1, illustrating the valve apparatus in an open condition;

FIG. 3 is an enlarged cross section taken along the line 3—3 on FIG. 1;

FIG. 4 is an enlarged cross section taken along the line 4—4 on FIG. 1;

FIG. 5 is an enlarged cross section taken along the line 5—5 on FIG. 1;

FIG. 6 is an enlarged cross section taken along the line 6—6 on FIG. 1;

FIG. 7 is an enlarged fragmentary longitudinal section of the sealing portion of the apparatus disclosed in FIG. 1, with the valve parts in a closed condition;

FIG. 8 is a view similar to FIG. 7, illustrating movement of the valve toward an open condition with a pressure differential internally of the valve apparatus;

FIG. 9 is a view similar to FIG. 7, illustrating a further condition of the valve apparatus as it is being moved to an open condition.

The apparatus A illustrated in the drawings is designed primarily for use within a well bore to control flow of fluids between the interior of a tubular string (not shown) extending to the top of a well bore and the annulus around the tubular string. It is particularly useful in connection with a lower tool D, such as a retrievable well packer adapted to be anchored in packed-off condition in a well casing against movement in both longitudinal directions. The specific well tool D forms no part of the present invention, and for that reason only the upper tubular end portion of its body is illustrated in the drawings.

The valve apparatus A includes an inner mandrel 10, the upper end of which is adapted to be attached to the lower end of a tubular string, such as drill pipe or tubing extending to the top of the hole. This mandrel is telescopically arranged within an outer housing or cylinder 11, the lower tubular head 12 of which is threadedly secured to the upper end of the body D of the lower tool. The housing 11 includes a lower housing section 13 threadedly attached to the head 12, the upper end of the lower section being threadedly attached to the lower end of an upper housing section 14, which, in turn, has its upper end threadedly secured to an upper head 15. To guard against inadvertent disconnection or unthreading between the lower head 12 and lower housing section 13, a cap screw 16 may extend through a hole 17 in the lower section, the screw being threaded into the lower head. Similarly a cap screw 18 extends within a hole 19 in the upper portion of the lower housing section 13 and is threadedly secured to the lower portion of the upper housing section 14.

The lower end of the upper housing section 14 is spaced above a flange 20 integral with and projecting inwardly of the lower housing section 13, to provide a groove 21 in which outer seal ring structure 22 is disposed. This seal ring structure is adapted to sealingly engage the outer surface or periphery of a floating sleeve or annular member 23, the inner cylinder surface of which is adapted to sealingly engage an inner seal ring structure 24 disposed within a peripheral mandrel groove 25 defined between a mandrel flange 26 and the upper end of a mandrel nut 27 threaded onto the main portion of the mandrel itself. The outside diameter of the inner seal ring structure 24 is substantially the same as the outside diameter of the mandrel flange 26 and of the portion of the nut 27 immediately below the seal ring structure, whereas the inside diameter of the outer seal ring structure 22 has substantially the same inside diameter as the inside diameter of the inner flange 20 and of the lower portion of the upper housing section 14 adjacent thereto.

The inner seal ring structure 24 is adapted to sealingly engage the inner surface of the floating sleeve 23, whereas the outer surfaces of the outer flange 26 and of the upper end of the nut 27 are of substantially the same diameter as the inside diameter of the floating sleeve 23, merely having a working clearance therewith. Similarly, the inner surface of the outer seal ring structure 22 is adapted to sealingly engage the outer surface of the sleeve 23, whereas the inner surfaces of the lower portion of the housing 14 and of the inner flange 20 have substantially the same diameter as the external diameter of the floating sleeve, having a working clearance with respect thereto. Thus, the mandrel portions on opposite sides of the groove 25 containing the inner seal ring structure 24 coact with the floating sleeve 23 to back up the inner seal ring structure, and tend to hold the latter confined within its groove. The housing structure on opposite sides of the interval groove 21 coact with the exterior of the floating sleeve 23 to confine the outer seal ring structure 22 in the internal groove 21 and tend to prevent its displacement therefrom.

The floating sleeve or annular member 23 is positively located with respect to the outer seal ring structure 22 by its engagement with an upper stop shoulder 30 on the upper housing section 14, which locates the floating sleeve completely across the outer seal ring structure. Similarly, the floating sleeve 23 is located fully across the inner seal ring structure 24 by a lower stop shoulder 31 on the mandrel nut 27 engaging the lower end of the sleeve. As clearly shown in FIGS. 1 and 7, when the mandrel 10 in its uppermost position relative to the housing 11, the lower stop shoulder 31 is engaging the lower end of the floating sleeve 23, the upper stop shoulder 30 engaging the upper end of the sleeve, and the floating sleeve being confined between both of such shoulders with its inner and outer surfaces in full engagement with the inner and outer seal ring structures 24, 22, respectively. The sleeve then extends to some extent above and below both seal ring structures, so as to cooperate with the mandrel periphery on both sides of the mandrel groove 25 and with the housing periphery on both sides of the housing groove 21, to provide a minimum of clearance space therebetween and thereby minimize the tendency for either of the seal ring structures to be forced from their companion grooves.

The inner mandrel 10 is telescoped downwardly relative to the outer housing 11 whenever the valve is to be placed in an open condition. As specifically illustrated, the mandrel can shift down within the housing until the lower end 32 of the mandrel engages the upper end of the lower head 12. It is to be noted that there is a substantial annular space 33 between the mandrel 10 and the lower housing section 13 to permit fluid to pass between the interior of the mandrel, through a plurality of circumferentially spaced lower notches or openings 34 in the mandrel, between the mandrel and housing, and through a plurality of circumferentially spaced side ports 35 in the upper housing section 14 to the exterior of the valve apparatus. When the mandrel 10 is shifted downwardly to open the valve to its fullest extent, the floating sleeve or annular member 23 can only move downwardly to a lesser extent coming to rest upon inwardly directed stop shoulders 36 formed on circumferentially spaced and relatively narrow prongs 37 extending inwardly of the lower housing section 13. When the floating sleeve 23 engages the stop shoulders 36, the mandrel 10 can continue moving downwardly to dispose its seal ring structure 24 a substantial distance below the lower end of the floating sleeve 23 and to also dispose a reduced diameter portion 10a of the mandrel opposite the floating sleeve, so that there is a substantial annular clearance space 38 between the mandrel and the floating sleeve. The inside diameter of the lower housing section 13 is substantially greater than the outside diameter of the floating sleeve 23, so that when the sleeve engages the stop shoulders 36 on the relatively narrow prongs 37 (which need only be three in number, spaced substantially 120 degrees apart), a comparatively large annular clearance space 39 exists between the periphery of the floating sleeve and the inner wall of the lower housing section. When engaged with the stop shoulders 36 on the prongs, the upper end of the floating sleeve 23 is disposed a substantial distance below the outer seal ring structure 22 and the periphery 10a of the mandrel opposite this seal ring structure is spaced inwardly thereof to a substantial extent so that the large annular clearance space 40 exists therebetween through which fluids can pass. This annular clearance space 40 extends between the mandrel and the housing at least to a position above the circulation or side ports 35.

When the mandrel 10 is moved upwardly, its lower stop shoulder 31 can engage the lower end of the sleeve 23 and shift it upwardly to a position across the outer seal ring structure 22 and against the upper stop shoulder 30, such as disclosed in FIGS. 1 and 7. When the mandrel is moved downwardly, the floating sleeve 23 may shift downwardly with it, if the pressure differential is externally of the device, but if the pressure differential is internally of the device, the floating sleeve will remain in engagement with the outer seal ring structure 22, until upper stop shoulders 41 on the mandrel, formed collectively on a plurality of circumferentially spaced ribs or keys 42, integral with or secured to the mandrel, engage the upper end of the sleeve 23 to carry the latter in a downward direction out of sealing engagement with the outer seal ring structure 22. The circumferentially spaced ribs or keys 42, are shown by way of example only as being three in number, spaced substantially 120 degrees apart, are slidable within longitudinal grooves 43 formed within ribs 44 extending inwardly of the upper housing section 14 (FIG. 5). These inwardly directed ribs 44 are relatively narrow, to minimize the extent of restriction of the annular space 40 between the mandrel and the upper housing section 14. The rib and groove arrangement is provided to enable rotary motion of the mandrel 10 to be transmitted through the housing 11 to the well tool D below the apparatus, in order to manipulate the latter, as required.

When the mandrel 10 has been shifted downwardly in the housing 11 to the fullest extent, as disclosed in FIG. 2, the floating sleeve 23 will come to rest upon the stop shoulders 36 on the narrow prongs 37, at which time the upper stop shoulders 41 on the keys 42 will be disposed a slight distance above the upper end of the floating sleeve. Thus, the floating sleeve is prevented from partaking of any substantial longitudinal movement relative to the mandrel 10 and the housing 11 when the valve is in open condition, so that fluid circulating through the apparatus in either direction will be prevented from carrying the ring 23 in either an upward or downward direction into engagement with one of the seal ring structures 22 or 24, which would restrict the passage area for the flow of fluid between the mandrel and the housing.

The valve arrangement prevents high pressure fluid differentials internally of the mandrel 10 or externally of the housing 11 from tending to force the seal ring structures 22, 24 out of their confining grooves 21, 25. Assuming a pressure differential to be present within the mandrel 10, with the valve in the closed condition disclosed in FIG. 1, a downward shifting of the mandrel within the housing to open the valve apparatus will be accompanied by downward movement of the inner seal ring structure 24 along the floating sleeve or ring 23, the internal fluid pressure holding this sleeve upwardly against the upper stop shoulder 30 and across the outer seal ring structure 22. As the inner seal ring structure 24 moves along the inner surface of the floating ring (as shown in FIG. 8), the pressure within the valve apparatus will be acting upon the seal ring structure, as its face is exposed, to a greater extent, tending to hold it within its mandrel groove 25. Any pressure tending to force the seal ring structure 24 out of the groove is prevented by the close clearance that exists between the periphery of the outer flange 26 and the inner surface of the floating sleeve 23, the clearance space normally being insufficient to permit extrusion therethrough of the seal ring material. The inner seal ring structure 24 will move completely off the inner surface of the floating sleeve 23, at which time the pressure around the inner seal ring structure is completely balanced, such pressure being incapable of removing the seal ring structure from its groove 25, regardless of the fact that it is no longer being supported by the floating sleeve.

When the outer flange 26 moves below the floating sleeve 23, the valve is in an open condition, the fluid being capable of passing from the interior of the mandrel 10 around its lower end, and thence upwardly around the mandrel and through the clearance space 38 between the floating sleeve and the mandrel, through the passage 40 and out through the side ports 35. Continued downward movement of the mandrel 10 within the housing 11 will cause the upper shoulders 41 on the mandrel keys 42 to engage the sleeve 23 and shift it downwardly from engagement with the outer seal ring structure 22, until the parts occupy the position illustrated in FIG. 2, in which the valve is fully opened. The fluid is then capable of passing from within the mandrel 10 around its lower end into the annular space 33 between the mandrel and the housing, such annular space being quite substantial, around the floating seal ring 23, since the fluid can pass both internally of the floating sleeve and through the clearance space 37 externally thereof, continuing upwardly through the annulus 40 between the mandrel and housing and out through the side ports 35. Of course, with the valve in the fully opened condition disclosed in FIG. 2, fluid can also pass from the exterior of the housing 11, through the ports 35, down through the clearance spaces 40, 38, 37, 33 between the mandrel and housing, and up into the interior of the mandrel 10. Regardless of the direction in which the fluid is flowing between the interior and exterior of the apparatus, the floating sleeve 23 is prevented from shifting to a sealed condition against either of the seal ring structures 22, 24 by being confined between the upper and lower stop shoulders 41, 36.

If it is assumed that fluid is being pumped down through the tubular string and the mandrel 10, and out through the open valve apparatus, with the parts in the condition illustrated in FIG. 2, and the mandrel 10 is shifted upwardly to close the valve apparatus, the upward movement of the mandrel will permit the fluid flowing upwardly past the floating sleeve 23 to shift it upwardly, the sleeve moving back up into sealing engagement with the outer sealing structure 22 and against the upper stop shoulder 30 of the housing, after which the inner seal structure 24 will move upwardly within the floating sleeve. At this time, the pressure differential is established within the mandrel 10 and within the housing 11 below the floating sleeve 23, but this pressure differential is incapable of displacing the inner seal ring structure 24 from its groove 25 since the upper end of the seal ring structure is backed by the outer flange 26, which makes a close shift with the inner surface of the floating sleeve 23. The mandrel can then be moved upwardly to its final position in which the lower stop shoulder 31 engages the sleeve 23, which position is disclosed in FIGS. 1 and 7. The valve apparatus is then in its fully closed condition.

If the valve is assumed to be in a fully closed condition, such as disclosed in FIGS. 1 and 7, and it is desired to open it with a pressure differential existing externally of the housing 11, the mandrel 10 is moved downwardly within the housing. Such downward movement will be accompanied by a downward movement of the floating sleeve 23, which will remain against the lower stop shoulder 31 (FIG. 9). The sleeve 23 will move along inner face of the outer seal ring structure 22, exposing it to the pressure differential, but such pressure differential cannot force the ring structure from the housing groove 21 since there is only a very small clearance space between the periphery of the floating sleeve 23 and the inner surface of the housing flange 20. When the upper end of the sleeve passes the lower end of the outer seal ring structure 22 the pressure is acting on the latter in all directions, there being no unbalanced forces tending to blow it out of the groove. As the floating sleeve 23 moves below the inner flange 20, the valve is in a partially opened condition, until the ring moves into engagement with the prong stop shoulders 36, whereupon continued downward movement of the mandrel within the housing will shift the inner seal ring structure 24 downwardly below the floating sleeve 23, there then being a full circulation area available around the floating ring, both internally and externally thereof. When the inner seal ring structure 24 is shifted downwardly out of the floating ring 23 there are no pressure differentials acting upon it, since the valve is in an open condition before this occurs, in view of the shifting of the floating sleeve below the outer seal ring structure 22 and the housing flange 20. The parts are then in the full opened condition as shown in FIG. 2, in which the valve is in a fully opened condition.

Assuming that the fluid is being circulated from the exterior of the tubing string and housing 11 through the open valve to the interior of the mandrel 10, and the mandrel is to be shifted to a closed condition while such circulation occurs, the mandrel 10 is moved upwardly within the housing 11. In view of the downward flow of fluid around the floating ring 23, it will remain against the prong stop shoulders 36 until the inner seal ring structure 24 is shifted upwardly therewithin to a closed extent, and the lower mandrel stop shoulder 31 engages the lower end of the sleeve 23. The floating sleeve and mandrel then move upwardly as a unit until the floating sleeve 23 is shifted within the housing flange 20 and across the outer seal ring structure 22. As soon as the floating sleeve moves thereacross, the pressure differential in the annulus 40 between the mandrel 10 and the housing 11 tends to force and press the seal ring structure 22 within its groove 21, but it cannot move it out of the groove in view of the small working clearance that exists between the floating seal ring structure 22 and the housing flange 20. The mandrel 10 moves upwardly until the floating sleeve 23 is positioned completely across the seal ring structure 22, and in engagement with the upper stop shoulder 30 on the housing, the parts then again being in the position disclosed in FIGS. 1 and 7.

Assuming the valve to be in an open condition with no pressure differential existing, it is readily placed in the closed condition shown in FIG. 1, since there is no tendency for any fluid under pressure to force the seal ring structures out of their respective grooves. The mandrel 10 may be merely moved upwardly, the mandrel shoulder 31 engaging the lower end of the sleeve 23 and shifting it upwardly with it against the housing shoulder 30, to place the parts in the positions disclosed in FIGS. 1 and 7. Assuming the valve is to be opened with no pressure differential existing, then the mandrel 10 need merely be lowered, the mandrel moving downwardly. If the floating ring 23 does not move downwardly with it, then the key shoulders 41 will engage the upper end of the sleeve 23 and move it downwardly until it contacts the prong shoulders 36, whereupon, the mandrel 10 will move downwardly to a further extent as limited by its engagement with the lower housing head 12. At this time the valve is in the fully opened condition shown in FIG. 2.

It is, accordingly, evident that regardless of the movement of the valve between opened and closed conditions with the existence of pressure differential either internally or externally of the valve apparatus, such pressure differentials cannot shift the seal ring structures 22, 24 out of their respective grooves. The floating sleeve or annular member 23 is always present to protect the seal ring structures, the latter being movable relatively off the floating sleeve 23 only under conditions in which pressure differentials tend to press the seal ring structure into its confining groove. The low pressure side of the seal ring structures are backed up by the floating sleeve 23 and adjacent parts of the mandrel 10 or the housing 11, as the case may be, the floating sleeve and such adjacent parts of the housing and mandrel having a close working clearance with one another.

Each seal ring 22, 24 is normally made of a pliant, elastic material, such as rubber or a rubber substitute. Under extremely high pressure differential conditions, it is preferred to use a seal ring structure which automatically reduces the working clearance between the floating sleeve 23 and the adjacent mandrel or housing portion to zero. Thus, the inner seal ring structure 24 includes a ring 50 of rubber or rubber-like material having upper and lower relatively thin steel rings 51, 52 secured thereto. These steel rings are disposed in companion recesses 53 in the inner rubber or rubber-like ring 50, with the periphery of the steel rings conforming to the intermediate peripheral portion 54 of the seal ring itself.

In a similar fashion, the outer seal ring structure 22 includes a rubber or rubber-like seal ring 55 having upper and lower relatively thin steel rings or bands 56, 57 mounted in respective upper and lower recesses 58, the inner surfaces of the steel rings having internal diameters substantially the same as the intermediate portion 59 of the rubber or rubber-like seal ring 55.

When no pressure is applied thereto, the periphery of the steel rings 51, 52 of the inner structure have a working clearance with the inner surface of a floating sleeve 23, whereas, the inner surfaces of the steel rings 56, 57 of the outer structure 22 also have a working clearance with the outer periphery of the floating sleeve 23. However, when the seal ring structures 22, 24 are subjected to pressure, then such fluid pressure acts on the rubber or rubber-like portion 50 or 55 of each ring to deform it and causes it to deform the elastic steel rings 51, 52, 56, 57 against the floating sleeve 23, reducing the clearance between each steel ring and the floating sleeve to zero. Accordingly, there is no space whatsoever existing between the floating sleeve 23 and the steel rings through which the rubber seal ring material can pass.

For example, referring to FIGS. 1 and 7, the existence of pressure internally of the valve apparatus will cause such pressure to act upon the inner and outer rubber seal rings 50, 55, compressing such rings within their grooves and deforming them to an extent in which the relatively thin and elastic steel band or ring 56 is pressed inwardly against the outer surface of the floating sleeve 23 and the thin elastic steel backing ring 51 is pressed in an outward direction against the inner surface of the floating sleeve. Accordingly, there is no clearance space existing between the rings 51, 56 and the sleeve 23 through which any rubber or rubber-like material can be forced under high pressure conditions.

The same situation prevails when a high pressure differential is present externally in the valve apparatus. Such pressure differential will act in a downward direction on the rubber or rubber-like seal rings 50, 55, compressing them within their grooves. The inner seal ring 50 is deformed in an outward direction to press the steel band 52 against the inner surface of the floating sleeve 23. At the same time, the compression of the outer ring 55 will deform its steel band or ring 57 inwardly against the outer surface of the floating sleeve 23, providing no clearance between the bands and floating sleeve through which any of the rubber or rubber-like material can be extruded by the high pressure differential.

Regardless of the existence of the high pressure differential internally of the apparatus or externally thereof, when such pressure is relieved, the rubber seal rings 50, 55 return to their initial conditions. In view of the elasticity of the steel rings, they also spring back or return to their initial conditions, in which there is a working clearance with the inner and outer surfaces of the floating sleeve 23.

To facilitate movement of the mandrel 10 between closed and opened positions within the housing 11, and to prevent pressure differentials from shifting the valve apparatus to an open position, it is substantially pressure balanced. The upper housing head 15 has an internal groove 65 containing a seal ring 66, such as a rubber O ring, slidably sealing along the periphery of the mandrel, this peripheral portion of the mandrel having substantially the same outside diameter as the tubular string thereabove. The upper housing section 14 has a cylinder wall 67 along which an annular piston 68 integral with the mandrel is slidable, there being a seal ring 69, such as a rubber or rubber-like O ring, disposed in a piston groove 70 and slidably sealing along the cylinder wall above the side ports 35 in the housing.

The cylinder space 71 between the mandrel 10 and housing 11 and above the piston communicates with the interior of the mandrel through one or more side ports 72 immediately above the piston. When the valve is closed and fluid under pressure is present within the mandrel 10, such fluid under pressure will act across the cross-sectional area of the mandrel between its inner surface and the inner surface of the floating sleeve 23, tending to shift the mandrel in an upward direction. The annular area over which the fluid under pressure acts in an upward direction is designated P in FIG. 1. The same fluid pressure is acting in a downward direction over the mandrel and its piston 68, since it can pass through the mandrel ports 72 above the piston. Thus, the pressure acts in a downward direction over the mandrel across the area R between the periphery of the mandrel which is sealed against the head seal ring 66 and the inner wall 67 of the cylinder. By making the areas P and R equal to one another, the hydraulic pressure acting on the mandrel 10 is balanced, which enables the mandrel to be shifted easily in a downward direction when the valve is to be opened.

Assuming the pressure differential to be present in the tubing-casing annulus around the apparatus, with the valve in the closed condition shown in FIG. 1, such pressure can also be balanced out, so that it does not tend to shift the mandrel relative to the housing or resist such shifting. By making the internal diameter of the cylinder wall 67 equal to the external diameter of the floating ring 23 any pressure differential externally of the apparatus acting on the mandrel is balanced out, since the downwardly facing area S on the piston is equal to the upwardly facing area T of the mandrel flange and the floating sleeve or ring 23.

To offer assurance that there is no leakage of fluid through the valve apparatus when it is in a closed condition, suitable thread seals 75 may be provided between the lower head 12 and lower housing section 13, as well between the upper head 15 and the upper housing section 14.

Assurance can be had against inadvertent shifting of the mandrel 10 between its opened and closed conditions by requiring that a substantial longitudinal force be exerted on the mandrel before such shifting can occur. The mandrel 10 has a two-piece cam ring 85 mounted within a peripheral mandrel groove 86, this ring being held within the groove by the inner wall of the upper head 15. An inner groove 87 is also defined in the housing between the lower end of the head 15 and a stop ring 88 resting upon a housing shoulder 89, in which an inherently contractible split control ring or sleeve 90 is mounted. The cam ring 85 has upper and lower tapered cam surfaces 91, 92 for coaction with companion upper and lower tapered surfaces 93, 94 on the control ring 90. Upward movement of the control ring 90 with respect to the housing 11 is limited by its engagement with the lower end of the upper head 15, whereas its downward movement within the housing is limited by its engagement with the upper end of the stop ring 88. This stop ring, however, has an internal diameter greater than the external diameter of the cam ring 85, to permit the latter to pass thereby.

When the valve is in the closed condition shown in FIG. 1, the cam ring 85 is disposed above the split control ring 90. Inasmuch as the normal inside diameter of the control ring 90 is substantially less than the outside diameter of the cam ring 85, the lower surface 92 of the latter must engage the upper tapered surface 93 of the control ring. When a sufficient downward force is opposed on the mandrel 10, the control ring 90 is expanded, to permit the cam ring 85 to slide therethrough to a position therebelow, such as shown in FIG. 2, in which the valve is in an opened condition. The force required to expand the control ring 90 sufficiently can be quite substantial. For example, it can be of the order of 5000 pounds total force. Such force can, of course, be varied by varying the dimensions of the control ring or the taper of the coengaging cam surfaces 92, 93.

When it is desired to shift the valve to a closed position from the open condition shown in FIG. 2, a substantial upward force must be exerted on the mandrel 10. When the mandrel moves upwardly, the upper tapered surface 91 on the cam sleeve engages the companion tapered surface 94 on the control sleeve 90, to expand the control sleeve outwardly, since the latter cannot move upwardly in the housing by virtue of its engagement with the housing head 15. When the sleeve 90 is expanded sufficiently, the cam sleeve 85 will slide through it back to the position illustrated in FIG. 1, in which the valve is in its closed condition.

It is, accordingly, evident that a substantial force is required to shift the mandrel 10 longitudinally with respect to the housing 11, to place the valve apparatus in the closed or opened condition. The housing 11 itself cannot move, inasmuch as it is secured to the lower tool D, which is anchored against movement in both directions to the wall of the well casing in which the apparatus is normally used.

The inventor claims:

1. Valve apparatus comprising first and second valve members movable one within the other; said valve apparatus having a pair of fluid passages adapted to be placed in communication with each other or out of communication with each other through a fluid path between said members interconnecting said passages; said first valve member having a first circumferential groove therein; first elastic seal means in said groove; said second valve member having a second circumferential groove therein; second elastic seal means in said second groove; an annular member between said valve members located in said fluid path between said passages and movable longitudinally relative to both of said first and second valve members and having inner and outer generally cylindrical surfaces simultaneously engageable with both of said seal means to prevent flow of fluid between said passages; means for disposing said annular member in simultaneous engagement with both of said seal means; means for locating said annular member out of engagement with both of said seal means when said valve apparatus is in open position; said annular member and said valve members being so constructed and arranged that said valve member is spaced laterally of both of said valve members when said valve apparatus is in open position to permit fluid to flow through and around said annular member.

2. Valve apparatus comprising an outer member; an inner member telescopically arranged within said outer member; said valve apparatus having a pair of fluid passages adapted to be placed in communication with each other or prevented from communicating with each other through a fluid path between said members interconnecting said passages; said outer member having an internal circumferential groove; first elastic seal means in said internal groove; said inner member having an external circumferential groove therein; second elastic seal means in said external groove; an annular member located in said fluid path between said passages and disposed between and movable longitudinally along both of said valve members and having inner and outer cylindrical surfaces adapted to simultaneously engage both of said seal means and to prevent flow of fluid between the passages; means for disposing said annular member in simultaneous engagement with both of said seal means; means for locating said annular member out of engagement with both of said seal means when said inner and outer members are in one relative position with respect to one another; said annular member and said inner and outer members being so constructed and arranged that said valve member is spaced laterally from said inner and outer members when said valve apparatus is in open position to permit flow of fluid through and around said annular member.

3. Valve apparatus comprising a generally vertical outer member; a generally vertical inner member telescopically arranged within said outer member; said apparatus having a pair of fluid passages adapted to be placed in communication with each other or prevented from communicating with each other through a fluid path between said members interconnecting said passages; said outer member having an internal circumferential groove; first elastic seal means in said internal groove; said inner member having an external circumferential groove therein; second elastic seal means in said external groove; an annular member located in said fluid path between said passages and disposed between and movable longitudinally with respect to both of said valve members and having inner and outer cylindrical surfaces adapted to simultaneously engage both of said seal means to prevent flow of fluid between said passages; means for disposing said annular member in simultaneous engagement with both of said seal means; means responsive to movement of one of said valve members downwardly with respect to the other of said valve members for locating said annular member out of engagement with both of said seal means to permit flow of fluid between said passages; said annular member and said inner and outer members being so constructed and arranged that said annular member is spaced laterally from said inner and outer member when said annular member is out of engagement with both of said seal means to permit flow of fluid through and around said annular member.

4. Valve apparatus comprising a generally vertical outer member; a generally vertical inner member telescopically arranged within said outer member; said apparatus having a pair of fluid passages adapted to be placed in communication with each other or prevented from communicating with each other through a fluid path between said members interconnecting said passages; said outer member having an internal circumferential groove; first elastic seal means in said internal groove; said inner member having an external circumferential groove therein; second elastic seal means in said external groove; an annular member located in said fluid path between said passages and disposed between and movable longitudinally with respect to both of said valve members and having inner and outer cylindrical surfaces adapted to simultaneously engage both of said seal means to prevent flow of fluid between said passages; means for disposing said annular member in simultaneous engagement with both of said seal means; one of said valve members being movable downwardly with respect to the other of said valve members to enable said annular member to move out of engagement with both of said seal means to permit flow of fluid between said passages; means for relatively moving said annular member from engagement with both of said seal means; and stop means on both of said valve members engageable with said annular member for simultaneously holding said annular member out of engagement with both of said seal means when said valve apparatus is in open position.

5. Valve apparatus comprising an outer valve member; an inner valve member telescopically arranged within said outer member; said valve apparatus having a pair of fluid passages adapted to be placed in communication with each other or prevented from communicating with each other through a fluid path between said members interconnecting said passages; said outer member having an internal circumferential groove; first elastic seal means in said internal groove; said inner member having an external circumferential groove therein; second elastic seal means in said external groove; an annular member located in said fluid path between said passages and disposed between and movable longitudinally with respect to both of said valve members and having inner and outer cylindrical surfaces adapted to simultaneously engage both of said seal means to prevent flow of fluid between said passages; means for disposing said annular member in simultaneous engagement with both of said seal means; means for locating said annular member out of engagement with both of said seal means when said valve member is in open position; said inner member being movable downwardly relative to said outer member to enable said annular member to move below said first seal means and said second seal means to move below said annular member in order to permit flow of fluid between said passages while said annular member is out of engagement with both of said seal means; said annular member and said inner and outer members being so constructed and arranged that said annular member is spaced laterally from said inner and outer members after said annular member is out of engagement with both of said seal means to permit flow of fluid through and around said annular member.

6. Valve apparatus comprising an outer valve member; an inner valve member telescopically arranged within said outer member; said valve apparatus having a pair of fluid passages adapted to be placed in communication with each other or prevented from communicating with each other through a fluid path between said members interconnecting said passages; said outer member having an internal circumferential groove; first elastic seal means in said internal groove; said inner member having an external circumferential groove therein; second elastic seal means in said external groove; an annular member located in the said fluid path between said passages and disposed between and movable longitudinally with respect to both of said valve members and having inner and outer cylindrical surfaces adapted to simultaneously engage both of said seal means to prevent flow of fluid between said passages; means for disposing said annular member in simultaneous engagement with both of said seal means; said inner member being movable downwardly relative to said outer member to enable said annular member to move below said first seal means and said second seal means to move below said annular member in order to permit flow of fluid between said passages; means on said inner member engageable with said annular member to shift said annular member downwardly out of engagement with said first seal means; and stop means on said outer member engageable with said annular member to limit its downward movement within said outer member and to permit said second seal means to move below said annular member; said annular member and said inner and outer members being so constructed and arranged that said annular member is spaced laterally from both of said valve members when disposed longitudinally between and out of engagement with both of said seal means to permit fluid to flow through and around said annular member.

References Cited in the file of this patent

UNITED STATES PATENTS

| | | |
|---|---|---|
| 2,194,261 | Allen | Mar. 19, 1940 |
| 2,429,778 | Stancliff | Oct. 28, 1947 |
| 2,506,188 | Alviset | May 2, 1950 |
| 2,626,776 | Martineau | Jan. 27, 1953 |
| 2,657,895 | Huber | Nov. 3, 1953 |
| 2,815,925 | Fisher | Dec. 10, 1957 |
| 2,858,099 | Althouse | Oct. 28, 1958 |